UNITED STATES PATENT OFFICE 1,934,689

PAVING COMPOSITION AND PROCESS OF MAKING SAME

David B. Andrews and Henry B. H. Hurd, North Haven, Conn.

No Drawing. Application February 27, 1931
Serial No. 518,889

12 Claims. (Cl. 94—7)

The present invention relates to a paving or surfacing composition which is extremely suitable for use in surfacing tennis courts, miniature golf courses, playgrounds, walks and promenades generally, and to a process of making such composition.

For these purposes it is desirable to have a surface that is firm, but resilient, which dries quickly, is easily repaired, smooth, and which does not invite vegetation, and withal, practically dustless.

According to the present invention a material which has the desired qualities is obtained by mixing with clay which forms the bulk of the material, a small amount of hydrated lime, baking the mixture at high temperature, treating same with anthracite screenings and zinc oxide, and subsequently grinding or crushing the baked and treated mass into very fine particles.

Preferably rich (fat) red clay taken from the ground is mixed with hydrated lime in sufficient amount to make the mass plastic for subsequent passage through a pug mill. The clay may be variant in quality, according to its source, but use of the pug mill permits a mixture of clays, and a thorough mixing and tempering of the clay from its original earthy condition to an even mass.

This mixture is taken from the pug mill in any suitable shape, and placed in a kiln where it is baked for approximately ninety-six hours at a temperature of about 2000°.

At a suitable stage in the heating, dependent upon the type and richness of clay being baked, anthracite screenings are added to the heated mixture and these screenings or dust, burning almost at incandescence, permeate the mass whereby a complete baking through and through is carried on until a product of the right quality is attained.

During the end of the heating period and while still at the high temperature, zinc oxide in the form of dust is introduced into the kiln, the kiln and clay being at a white heat, and the dust fuses or permeates the whole interior. The zinc oxide favorably affects the binding qualities of the clay, giving more stability and becoming an aid to the clay product when later used in "shedding" water.

At the conclusion of the baking, the bulk material or forms are crushed in a grinding mill and screened into very small particles and dust. Because of the zinc oxide, particles are produced which are substantially uniform throughout, thus making for stability (or grip) when used as a surface, as the particles will not readily become displaced nor unite.

This feature is important as it is almost impossible to obtain uniform particles directly from clay, because there are so many different kinds of clay particles and sand constituents.

The use of anthracite screenings and zinc oxide, while desirable in forming a more perfect product may either or both be omitted, dependent upon the type and condition of clay initially used.

While the proportions may be varied somewhat, as just indicated, and still provide a satisfactory material, it has been found that the best product results if the following proportions are used:—

| | Per cent |
|---|---|
| Lime | 1½ |
| Anthracite screenings | 10 |
| Zinc oxide | 1 |

The balance or 87½% is made up of the clay which is being treated to form the surfacing composition.

One example of the use of this material as a surface may be found as a surfacing for tennis courts, wherein it is preferable to first place a layer of cinders or ashes which may be screened or unscreened, in accordance with conditions, and then a layer of larger particles of the above described composition, covered with a layer of finer particles or dust. In the screening of the crushed baked forms those particles which will not pass through a sixteen mesh screen are very suitable for the under-layer, and the dust or finer particles which pass through the screen are suitable for the top dressing. The entire body of the court may be watered and rolled as desired during its construction.

In the event that holes or depressions occur the "dust" just described is very satisfactory for making repairs and immediately becomes an integral part of the original composition.

From the foregoing it will be evident that a surfacing composition formed of treated clay is provided, which is admirably adapted to provide a firm but resilient surface resembling in appearance the conventional clay court, but which will have many advantages over untreated clay and at the same time many advantages of cement which is sometimes used in the making of tennis courts. This composition is, however, quite different from cement, will not have the "setting" qualities of cement and may be easily repaired. It will pack much as clay will when moistened and will dry readily, and will not invite vegetation.

What we claim as new and desire to secure by Letters Patent of the United States, is:—

1. The process of producing a surfacing composition for playing grounds and the like which comprises thoroughly mixing a relatively small amount of hydrated lime with a substantially greater amount of clay, tempering such mixture, baking the mixture in bulk form, adding anthracite screenings while said mixture is at high heat, then adding zinc oxide while such mixture is at high heat, and subsequently grinding the baked and treated form into fine particles.

2. The process of producing a surfacing composition for playing grounds and the like which comprises thoroughly mixing a relatively small amount of hydrated lime with a substantially greater amount of clay, tempering such mixture, molding said mixture into a form and baking the form, adding anthracite screenings while said mixture is at high heat, then adding zinc oxide while such mixture is at high heat, and subsequently grinding the baked and treated form into fine particles, and screening said particles.

3. The process of producing a surfacing composition for playing grounds and the like which comprises heating a mixture of hydrated lime and clay, in which there is a preponderance of clay, adding anthracite screenings to the heated mixture to thoroughly fuse the same throughout, and adding zinc oxide to the fused mass to harden same.

4. A surfacing composition for playing grounds and the like comprising clay, lime, anthracite screenings and zinc oxide, in the proportion of lime approximately 1½ percent, screenings approximately 10 percent, and zinc oxide approximately 1 percent, and the balance clay, said composition being a firm, resilient mass.

5. A surfacing composition for playing grounds and the like resulting from the baking of an homogeneous mixture of clay, hydrated lime, anthracite screenings and zinc oxide, and in which there is a preponderance of clay, said composition being a firm, resilient mass.

6. A surfacing composition for playing grounds and the like, resulting from the baking of an homogeneous mixture of clay, hydrated lime, finely divided carbonaceous material and a flux, and in which there is a preponderance of clay, said composition forming a firm, resilient mass.

7. The method of constructing a firm, resilient playing ground, which consists in producing a surfacing composition by thoroughly mixing a relatively small amount of hydrated lime with clay, with said clay forming a preponderance of the mixture, tempering such mixture, baking the mixture in bulk form, adding zinc oxide while the mixture is at a relatively high heat, and subsequently grinding the baked and treated form into fine particles, screening the particles through a screen of approximately sixteen mesh, applying the coarse particles resulting from the screening to a pervious foundation and then applying finer particles resultant from the screening as a top dressing.

8. The method of constructing a firm, resilient playing ground which consists in producing a surfacing composition by thoroughly mixing a relatively small amount of hydrated lime with clay, tempering such mixture, baking the mixture in bulk form, adding anthracite screenings while said mixture is at high heat, then adding zinc oxide while such mixture is at high heat, and subsequently grinding the baked and treated form into fine particles, screening the particles, applying the coarse particles resulting from the screening to a foundation and then applying the finer particles resultant from the screening, as a top dressing.

9. A playing ground having a firm, resilient surface composed of a top layer of a homogeneous mixture of clay, hydrated lime, and zinc oxide, with said clay forming a preponderance of the mixture, baked together and reduced to a powdered state, and an undersurface of the same material, and a pervious foundation for said layers, said top layer being reduced to a state of fineness sufficient to pass through a sixteen mesh screen, and said underlayer being reduced to a state of coarseness which will resist a passage through a sixteen mesh screen.

10. A playing ground having a firm resilient surface composed of a homogeneous mixture of clay, hydrated lime, anthracite screenings and zinc oxide baked together and reduced to a powdered state, and in which there is a preponderance of clay.

11. A playing ground having a firm resilient surface, composed of a top layer of a homogeneous mixture of clay, hydrated lime, anthracite screenings and zinc oxide baked together and reduced to a powdered state, and an undersurface of a homogeneous mixture of clay, hydrated lime, anthracite screenings and zinc oxide baked together and reduced to a state of coarseness which will resist passage through a sixteen mesh screen.

12. A playing ground having a firm resilient surface composed of an under layer of a homogeneous mixture of clay, hydrated lime, anthracite screenings and zinc oxide baked together and reduced to a state of coarseness which will resist passage through a sixteen mesh screen, and a top layer of the same mixture which is reduced to a powdered state sufficient to pass through a sixteen mesh screen.

DAVID B. ANDREWS.
HENRY B. H. HURD.